United States Patent
De Haan

(10) Patent No.: US 10,057,559 B2
(45) Date of Patent: Aug. 21, 2018

(54) TRANSFERRING OF 3D IMAGE DATA

(75) Inventor: Wiebe De Haan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 495 days.

(21) Appl. No.: 13/990,447

(22) PCT Filed: Dec. 2, 2011

(86) PCT No.: PCT/IB2011/055428
§ 371 (c)(1),
(2), (4) Date: May 30, 2013

(87) PCT Pub. No.: WO2012/073221
PCT Pub. Date: Jun. 7, 2012

(65) Prior Publication Data
US 2013/0250058 A1    Sep. 26, 2013

(30) Foreign Application Priority Data

Dec. 3, 2010 (EP) .................. 10193650.8
May 4, 2011 (EP) .................. 11164718.6

(51) Int. Cl.
*H04N 13/00* (2018.01)
*H04N 13/02* (2006.01)

(52) U.S. Cl.
CPC ....... *H04N 13/0029* (2013.01); *H04N 13/004* (2013.01); *H04N 13/007* (2013.01); *H04N 13/0022* (2013.01); *H04N 13/0292* (2013.01)

(58) Field of Classification Search
CPC ............. H04N 13/0022; H04N 13/004; H04N 13/007; H04N 13/0029; H04N 13/0292
(Continued)

(56) References Cited

U.S. PATENT DOCUMENTS

| | | | |
|---|---|---|---|
| 2010/0238267 A1* | 9/2010 | Izzat et al. ..................... 348/43 |
| 2011/0242104 A1* | 10/2011 | Zhang et al. .................. 345/419 |
| 2012/0256951 A1 | 10/2012 | Tsukagoshi | |

FOREIGN PATENT DOCUMENTS

| | | |
|---|---|---|
| WO | 2007069195 A2 | 6/2007 |
| WO | 2008115222 A1 | 9/2008 |

(Continued)

OTHER PUBLICATIONS

Tsukagoshi, Ikuo, "Sony Proposal for Disparity Temporal Update to DVB 3D Subtitles", Version 1.0, Nov. 2010.
(Continued)

*Primary Examiner* — On S Mung

(57) ABSTRACT

A 3D source device for outputting a three-dimensional image signal, the three-dimensional image signal comprising multi-view image data, the 3D source device comprising an input for receiving image data; a generator arranged to generate the three-dimensional image signal based on the image data, the three-dimensional image signal comprising a first component comprising multiple 2D images for use in stereoscopic viewing, a second component comprising overlay data and a third component defining disparity signaling information for use in overlaying image data over the respective ones of the multiple 2D images. New disparity signaling information in a further third component overrules the disparity signaling information in the third component.

20 Claims, 4 Drawing Sheets

450

460

(58) Field of Classification Search
USPC .......................................................... 348/43
See application file for complete search history.

(56) References Cited

FOREIGN PATENT DOCUMENTS

| | | |
|---|---|---|
| WO | 2010064118 A1 | 6/2010 |
| WO | 2010095074 A1 | 8/2010 |

OTHER PUBLICATIONS

Doyen, Didier et al "Graphic/Subtitle Insertion on 3D Content", Technicolor, 2010.

* cited by examiner

TRANSFERRING OF 3D IMAGE DATA

FIELD OF THE INVENTION

The invention relates to a method of transferring of three dimensional (3D) image data, the method comprising, at a 3D source device, processing source image data to generate a 3D display signal, the 3D display signal comprising image frames, and outputting the 3D display signal; and, at a 3D target device, extracting the 3D image data and providing an output based on the 3D display signal.

The invention further relates to the above mentioned 3D source device, the 3D display signal and the 3D target device.

The invention relates to the field of transferring three dimensional (3D) image data, in compressed form, such as e.g. for an extension for DVB directed at 3D, or uncompressed via a high-speed digital interface, e.g. HDMI.

BACKGROUND TO THE INVENTION

Various schemes for displaying three dimensional images (static, or moving images) are known. One well-known scheme simultaneously displays two images which are encoded for the left eye and right eye by means of different optical polarizations, or colors (e.g. red and green). A viewer wears a pair of special glasses which have lenses in front of the left and right eyes. The lenses are arranged to pass only the image intended for that eye, i.e. a left eye sees only the image intended for that eye. Another stereoscopic display technique sequentially presents an image intended for the left eye, and an image intended for the right eye. A user wears a special pair of glasses which are shuttered in synchronism with the displayed images, such that the left eye shutter is open during the period when the left eye image is displayed, and the right eye shutter is open during the period when the right eye image is displayed.

Auto stereoscopic display techniques remove the need for a viewer to wear special glasses. One known scheme uses a flat panel display with multisided slanted lenticular lenses mounted in front of display elements. An example of this kind of display is described in WO07/069195 A2.

Devices for sourcing 2D video data are known, for example video players like DVD players or set top boxes which provide digital video signals. The source device is to be coupled to a display device like a TV set or monitor. Image data is transferred from the source device via a suitable interface, preferably a high-speed digital interface like HDMI. Currently 3D enhanced devices such as 3D Blu-ray players are entering the market. For transferring the 3D video signals from the source device to the display device new high data rate digital interface standards are being developed, e.g. based on and compatible with the existing HDMI standard. Transferring 2D digital image signals to the display device usually involves sending the video pixel data frame by frame, which frames are to be displayed sequentially. Such frames may either represent video frames of a progressive video signal (full frames) or may represent video frames of an interlaced video signal (based on the well known line interlacing, one frame providing the odd lines and the next frame providing the even lines to be displayed sequentially).

Likewise distribution of 2D content to end-users is known from DVB. With the market introduction of 3D Blu-ray devices, stereoscopic content has become available and there has been a call to also enable the distribution of this content by other means such as through cable, or satellite. In order to accommodate the industry is extending the DVB framework to enable the distribution of 3D content over DVB.

SUMMARY OF THE INVENTION

The present invention seeks to provide an alternative way of delivering three-dimensional image data (3D), in a manner not addressed by the prior art.

The claims define embodiments of the present invention. According to the invention a 3D source device is provided for outputting a three-dimensional image signal, the three-dimensional image signal comprising multi-view image data, the 3D source device comprising:

an input for receiving image data;

a generator arranged to generate the three-dimensional image signal based on the image data, the three-dimensional image signal comprising:

a first component comprising multiple 2D images for use in stereoscopic viewing;

a second component comprising overlay data;

a third component defining disparity signaling information for use in overlaying image data over the respective ones of the multiple 2D images, the third component comprising a parameter defining disparity information having a time-varying disparity profile; and a further third component, at a later time the three-dimensional image signal than the third component, defining new disparity signaling information for use in overlaying image data over the respective ones of the multiple 2D images, the further third component comprising a further parameter defining new disparity information having a new time-varying disparity profile, the new disparity signaling information in the further third component overruling the disparity signaling information in the third component.

Also according to the invention a 3D target device is provided for receiving a three-dimensional image signal, the three-dimensional image signal comprising multi-view image data, the 3D target device comprising:

a receiver for receiving the three-dimensional image signal;

a demultiplexer for demultiplexing the three dimensional image signal in at least:

a first component comprising multiple 2D images for use in stereoscopic viewing;

a second component comprising overlay data;

a third component defining disparity signaling information for use in overlaying image data over the respective ones of the multiple 2D images, the third component comprising a parameter defining disparity information having a time-varying disparity profile; and a further third component, at a later time in the three-dimensional image signal than the third component, defining new disparity signaling information for use in overlaying image data over the respective ones of the multiple 2D images, the further third component comprising a further parameter defining new disparity information having a new time-varying disparity profile, the new disparity signaling information in the further third component overruling the disparity signaling information in the third component; and a generator for generating respective 2D images for use in stereoscopic viewing, wherein the overlay data is overlaid as defined within the disparity signaling information.

It is noted that the first component may comprise stereopairs.

It is an insight of the inventors that there is a substantial difference between content that is pre-authored such as for 3D Blu-ray discs and content which is typically broadcast over DVB; content broadcast over DVB quite often includes live content; such as news, sports games, or content for which it is financially unattractive to justify the cost of extensive authoring as for the content on 3D Blu-ray discs.

Certain authoring tasks which are not difficult for 2D live content are more difficult to implement for 3D live content. An example of such an authoring task is the generation of subtitles for real-time footage. Whereas in 2D it is possible to insert subtitles on the fly, by manual or computer assisted subtitle generation, there is a complicating factor in that the task of subtitling 3D content provides additional challenges. In the third component, the disparity signaling information provides a predictor for indicating how a disparity of an overlay is expected to change over time. In the further third component, the further predictor for indicating how a disparity of an overlay is expected to change over time, overrules the earlier predictor.

In order to reduce annoyance with viewers the subtitles need to be positioned in a manner so as not to compromise the depth impression provided by the three-dimensional (3D) image data. A further complicating factor, is the fact that once a 3D target device has received the three-dimensional (3D) image data and has generated output data for display to an end-user, the device in turn may also need to overlay additional graphics, in the form of an On-Screen-Display (OSD) for its user interface.

In order to address these issues the present invention proposes a method of generating a three-dimensional image signal, the three-dimensional image signal comprising a first component in the form of multi-view image data, a second component representing data for overlaying the multi-view image data and a third component in the form of metadata signaling disparity information, the disparity signaling information providing a predictor for a (sub)region of the image indicating how the disparity in this region is expected to change over time.

Preferably the predictor is a single predictor. Using this predictor it is possible for a 3D target device to properly overlay the subtitle and/or graphics information, by properly displacing the respective subtitle and/or graphics information accordingly. It will be clear to those skilled in the art that the displacement of the graphics in such a (sub)region is preferably spread over adjacent views; e.g. in case of stereo-pairs the displacement of the graphics is preferably distributed equally between the left and the right image.

Using the predictor it is possible to provide a more gradual variation of the disparity between different moments in time. Moreover when the prediction proves to be inaccurate, which may happen when encoding live footage, it is possible to signal a corrective value without introducing much overhead.

Preferably the disparity signaling information also provides an indication of the current value of the disparity for the image region so as to improve the ease of accessing the stream at a random point in time.

In one embodiment the disparity signaling information defines a first disparity value for a first presentation timestamp, and a coefficient indicating the variation of the disparity value over time. This coefficient may be specified in the variation of pixels or pixel fractions per frame, or alternatively based on a system clock available at both the 3D source and 3D target device.

Optionally, the parameter defining the time-varying disparity profile is time.

Optionally, the third component comprises information defining at least two disparity values. Also, the third component may define a time interval for a transition from a first of the at least two disparity values to a second of the at least two disparity values.

In another embodiment the disparity signaling information defines a first disparity value for a first presentation timestamp and a second disparity value for a second presentation timestamp. This information also provides a 3D target device with the possibility of determining a disparity value for display of the subtitle/graphics information. Use of two fully defined points provides a safety feature in that if a signaling unit is lost in either transmission or otherwise, excessive variation in disparity may be prevented.

In a further refinement the disparity signaling information predictor may further include a disparity profile, selected from a predefined set of profiles, thereby enabling fine-tuning of the disparity signaling. The latter enables more gradual variations, which may be implemented when content is passed through a time-delay prior to being subtitled. Optionally, the third component comprises a parameter selecting one of a predefined disparity transition profile. Optionally, the selected predefined disparity transition profile is parameterized by at least one parameter and the second component further comprises a parameter for use in defining the time-varying disparity profile.

As will be clear to those skilled in the art, the method of generating a three-dimensional signal comprising, has a counterpart in the form of a method of receiving the three-dimensional signal comprising the metadata signaling disparity information.

The method of receiving the three-dimensional image signal comprises a step of using the use the third component in the three-dimensional image signal for overlaying the overlay data comprised in the second component on the three-dimensional image signal from the first component in the designated regions with the disparity values in line with the disparity signaling component.

The invention further relates to a 3D source device comprising: a receiver for receiving multiview image data, a generator for generating a three-dimensional image signal comprising: a first component in the form of multi-view image data, a second component representing data for overlaying the multi-view image data and a third component in the form of metadata signaling disparity information, the disparity signaling information providing a single predictor for a (sub)region of the image indicating how the disparity in this region is expected to change over time.

The invention further relates to a 3D target device for receiving the three-dimensional signal according to the invention comprises a receiver for receiving the three-dimensional signal according to the invention, and an overlay generator arranged to overlay the overlay data comprised in the second component over the respective images comprised in the first component in the designated regions as specified in the disparity signaling information, with the disparity values in line with the disparity signaling component.

The invention further relates to the three-dimensional image signal according to the invention.

The invention further relates to software for implementing a method for generating or receiving the three-dimensional signal according to the invention.

The invention further relates to a computer program product comprising instructions, which when executed on a computer implemented a method for generating or receiving the three-dimensional signal according to the invention.

Although the above has been described with reference to the transmission of a 3D video signal over DVB (Digital Video Broadcasting), it will be appreciated that the invention may also be applied within the context of other broadcast schemes such as ATSC (Advanced Television Systems Committee) Likewise although the examples mentioned relate to DVB, which includes compressed video data, it is noted that the present invention is equally applicable within the context of a physical device interfaces, such as HDMI (High-Definition Multimedia Interface) or display port.

In view of the above it is thus possible that the present invention is first used on the interface from 3D-DVB, wherein a 3D source device in the form of the broadcaster sends a first three dimensional image signal according to the invention to a 3D target device in the form of a Set Top Box (STB). The STB may then e.g. overlay an OSD over the incoming signal, and may based thereon generate a second three dimensional image signal in accordance with the invention and send that over the HDMI interface, thus the STB now acting as a 3D source device, to a 3D television set.

BRIEF DESCRIPTION OF THE DRAWINGS

Embodiments of the invention will be described, by way of example only, with reference to the accompanying drawings in which.

DESCRIPTION OF PREFERRED EMBODIMENTS

The present invention provides an alternative way of delivering three-dimensional image data (3D), in a manner not addressed by the prior art. The present invention aims to address the distribution of three-dimensional image signals and may be used for live as well as recorded content alike.

In contrast to the prior art the present invention addresses issues related to real-time subtitling. It is an insight of the inventors that there is a substantial difference between content that is pre-authored such as for 3D Blu-ray discs and content which is typically broadcast over DVB; content broadcast over DVB quite often includes live content; such as news, sports games, or content for which there is no time to perform extensive authoring.

Figure 1A:
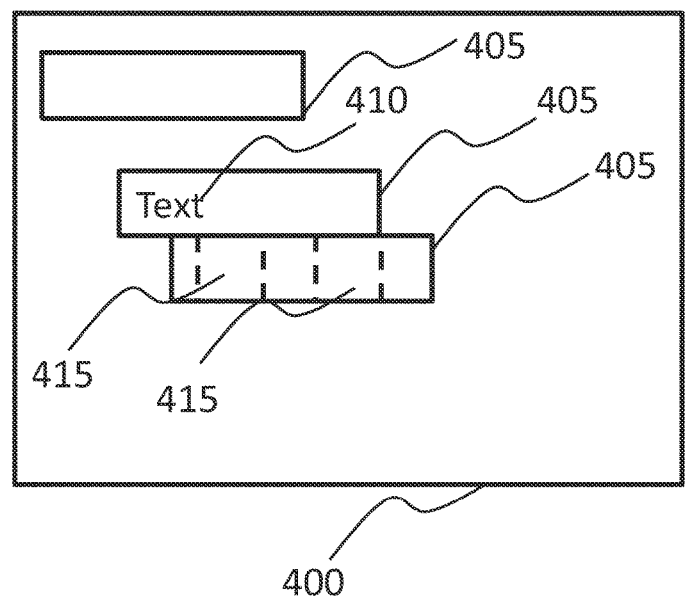
FIG. 1A, illustrates some of the concepts used throughout the application when referring to overlaying graphics, including regions, sub-regions and objects.

Referring to FIG. 1A, FIG. 1A illustrates some of the concepts referred to throughout this application when referring to overlaying graphics. Within the context of the present invention when referring to the information required for creating an overlay for a multi-view image, this information will be indicated as a page definition. Here the page definition will be described using an image reference 400 which corresponds with the display area of a display device, for example for a time-sequential stereo display this area reflects the pixel array of the display device.

The page definition includes e.g. region definitions, these regions definitions, define regions 405 within the image reference 400, here rectangular areas where graphics may be overlaid. In addition this example page definition also includes object definitions, which define objects 410, that may be overlaid within the regions 410.

Although the example object 410 shows the word "Text" it is noted that such an object definition can be one of many objects. For example an object could be defined as any one combination of those listed below:

a text string a text string and font selection, optionally with additional attributes defining e.g. the typeface style, size, italic, bold, which are known from conventional 2D typefaces. Additional features may be provided that provide a text string with depth attributes, such as e.g. an font depth value, and/or through the selection of an embossed font style.

bitmapped graphics, optionally also having a certain depth, and animated bitmapped graphics, again optionally also having a certain depth.

The example further shows the definition of two so-called sub-regions 415, located within a single region 405, and demarcated by the dashed lines.

In order to properly overlay the object 410 in the region 405, a further definition is required, the disparity signaling definition, the disparity signaling definition may be provided in the stream in the form of a disparity signaling segment.

In its simplest form the disparity signaling segment provided for by the present invention defines a disparity value on the page level. As a result e.g. in case of a stereo display all information provided in the overlay regions will be displaced by the same extend when generating the left and right images.

The advantage of using a page level scheme is that the devices having overlay functionality can be kept relatively simple.

In a more advanced scheme, the disparity signaling definition provides a disparity value for regions and/or the sub-regions. In this manner more advanced overlays can be realized. Consider e.g. a situation wherein subtitles need to be provided for a dialogue wherein the two persons having the dialogue are located at different positions, one on the left near the camera, one on the right further away from the camera. The more advanced disparity signaling scheme can also enable this more complex subtitling scheme.

When overlaying graphics having a certain depth, the displacement of the respective parts of the graphics will have to be adapted based on its depth, however this will be clear to those skilled in the art.

Figure 1B:
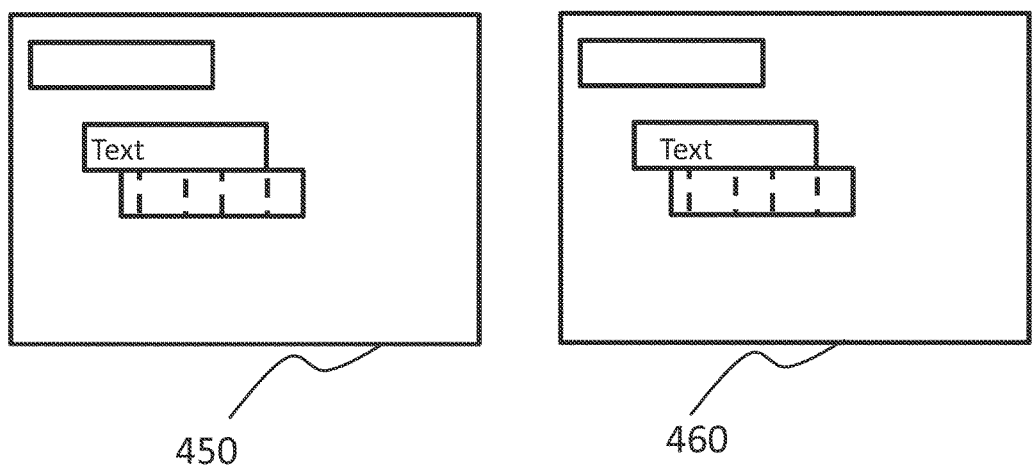
FIG. 1B, illustrates how disparity settings for a region can be used to generate a left and right image respectively of a stereo pair.

FIG. 1B shows how the disparity signaling within a 3D image signal can be used to generate in this case a left image (450) and a right image (460). The left image 450 and the right image 460 are based on the page definition as illustrated in FIG. 1A. In this example only the region 405 comprising the object 410 is given a non-zero disparity value. Consequently when generating an left image 450, in this example, the object 410 is displaced towards the left defined by the disparity value divided by 2 and the object 410 is displaced towards the right when generating the right image 450 by the disparity value divided by 2.

It will be clear to the skilled person that the choice to encode the disparity value as the sum of the displacement for a left image and for a right image is arbitrary and could easily be replaced by another encoding.

Although it may appear to be straightforward to provide a page definition for overlaying graphics, the actual process of generating a page definition is complicated by the fact that e.g. subtitles or overlays need not be in sync with information provided in the underlying footage being overlaid.

For example consider the situation wherein a particular person is interviewed at a live event. At a certain moment the interviewer closes the interview and speaks the last sentence of his dialogue. At that point the director cuts to another camera. However in order for viewer to read the subtitles, the subtitles will be overlaid over the new cut scene.

Figure 2:
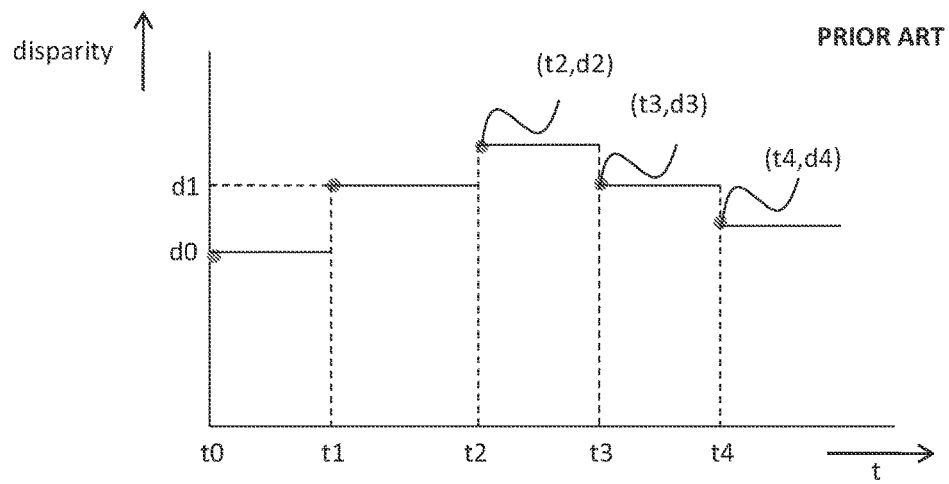
FIG. 2, shows the prior art mechanism for defining disparity for an overlay.

In order to address this problem, a prior art scheme proposes to have a time-varying positioning of overlays. FIG. 2 illustrates the prior art process. Consider e.g. the situation wherein the disparity signaling occurs on the page level. The page definition defines that at time t0, the disparity value used should be d0, at time t1 the disparity value used should be d1, at time t2, the disparity value used is d2, etc. In order to enable a 3D target device to properly use the disparity information the information will be sent in the three dimensional image data some time before it needs to be used, such that at the moment that it is to be used, i.e. the pair (t0,d0) will have to be received by the 3D target device prior to the presentation time stamp corresponding with t1. In other words the entire page definition for that presentation time stamp has to be complete prior to the presentation time-stamp.

It is an insight of the inventors of the present invention, that although this particular approach does allow adaptation of e.g. subtitle disparity on scene changes, the changes in disparity values will be rather crude as evidenced by the step like changes in disparity.

In order to address this issue the inventors have devised an alternate approach, wherein the disparity signaling information comprises a predictor for a (sub)region of the image, indicating how the disparity in this region is expected to change over time.

Figure 3A:
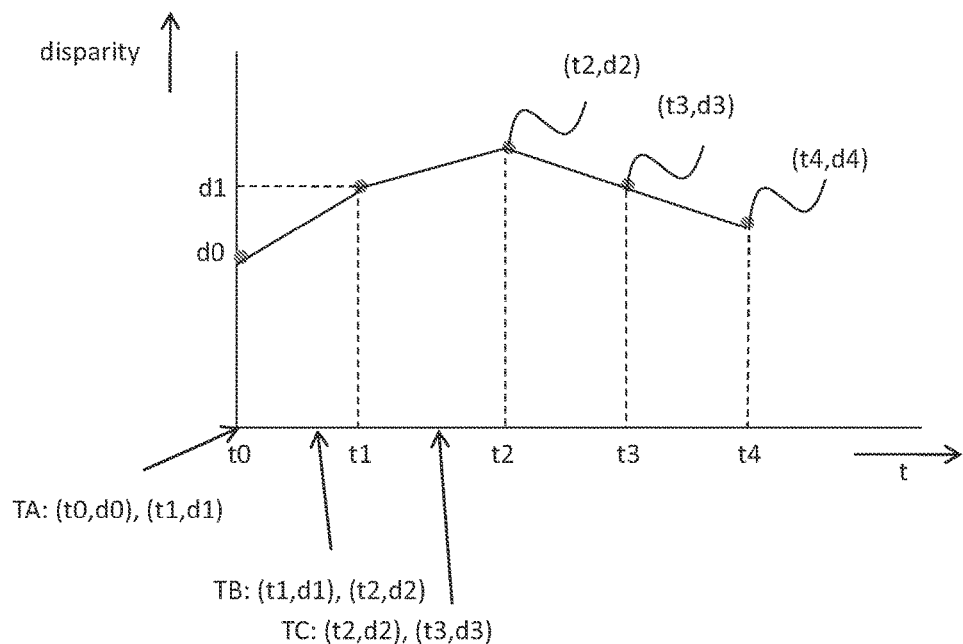
FIG. 3A, shows how in an embodiment according to the invention the disparity values for an overlay may be defined.

An example of this scheme is provided in FIG. 3A. Consider again the situation wherein disparity control occurs on the page level. At a certain moment in time TA, a first time indication t0 is provided and an associated disparity value d0. The first time indication relates to a time within the near future close to the current moment in time. In addition a second time indication t1 and associated second disparity value are provided d1.

At a later time TB, the information (t1,d1) and (t2,d2) are received. Moreover at yet a later time TC the information (t3,d3) and (t4,d4) are received. By providing in this update information the current and the next disparity value, the 3D target device receiving the three-dimensional image signal can interpolate between these two moments in time, thereby enabling a linear interpolation as indicated in FIG. 3A.

Figure 3B:
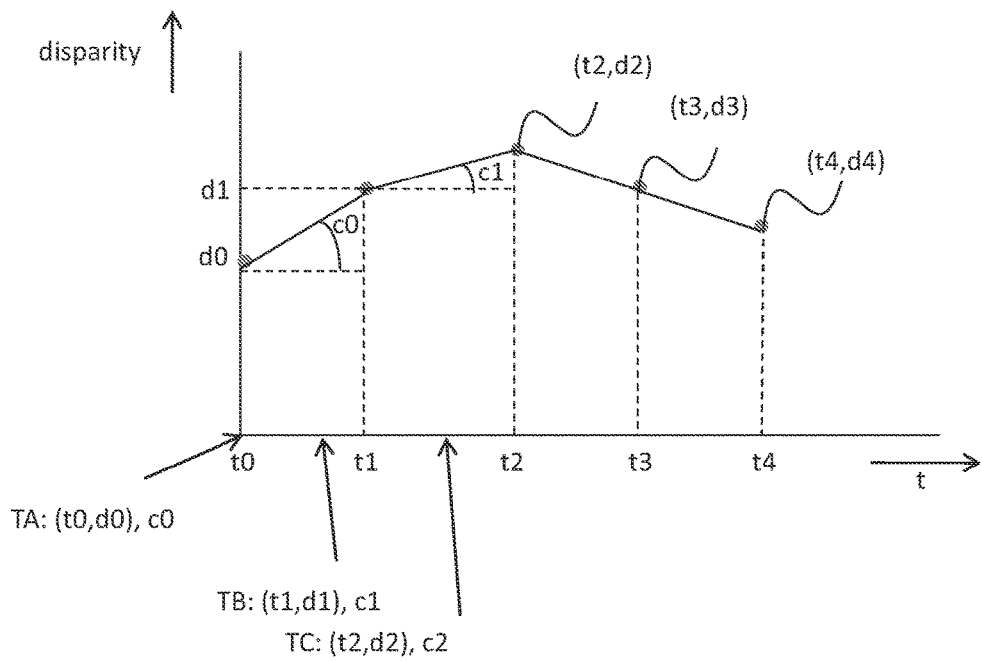
FIG. 3B, shows how in an alternative embodiment according to the invention the disparity values for an overlay may be defined.

An alternative scheme is provided in FIG. 3B, here effectively the same information is provided as was done with reference to FIG. 3A, but the format of the disparity signaling information is different. Here at time TA, three values are provided; (t0,d0) as described hereinabove and cO, cO defining the variation of disparity over time.

It should be noted that both the examples described above with reference of FIGS. 3A and 3B include redundant data in that a 3D target device parsing an incoming three-dimensional image signal, receives redundant information; in principle all but the first pair of data (t0,d0) are signaled twice. Strictly speaking this is not necessary as a 3D target device is capable of tracking these values based on the data received.

However in order to create a more robust system and to shorten the time required to properly access content it may be beneficial to at times repeat data.

Figure 3C:
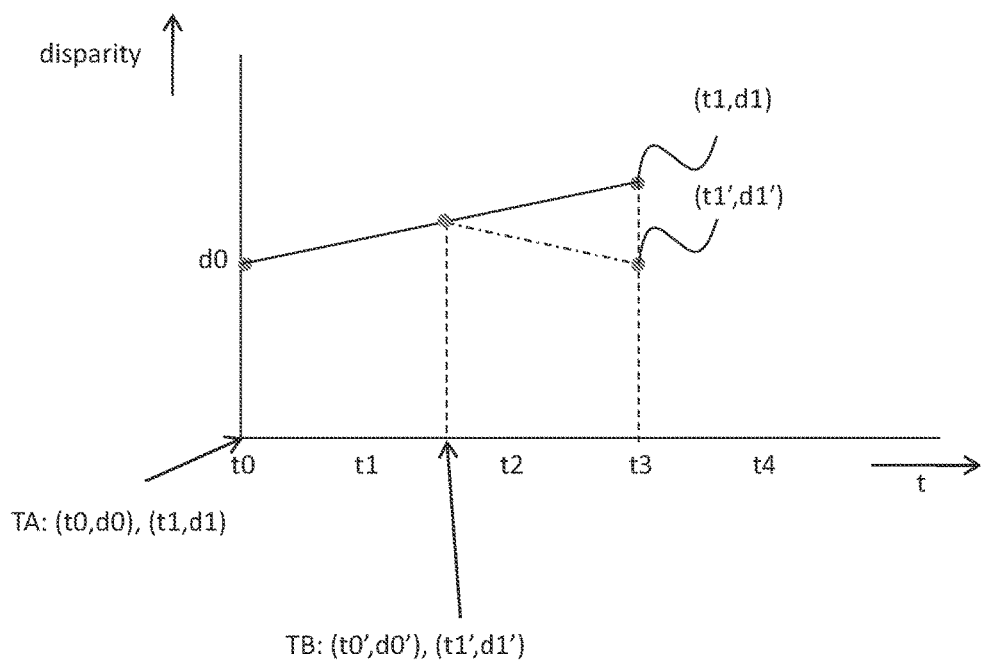
FIG. 3C, illustrates an advantage of the present invention over the prior art.

A further advantage of the present invention is illustrated in FIG. 3C. Consider once more that situation wherein disparity signaling is on the page level. Consider e.g. the situation wherein a three-dimensional image signal is generated for a live event. At a certain moment in time TA, prior to first time indication t0, the page level disparity is set at d0 (t0,d)). In view of the fact that there is a moderate rate of change in the scene, it is expected that at a further moment in time, second time indication t1, the page level disparity should be d1 (t1,d1). Both pairs are provided in the disparity signaling segment.

However at moment t0' in between t0 and t1, as a result of a change in the scene, the previous predictor of the disparity level (t1,d1) appears to be erroneously. Consequently, the present invention proposes to "overrule" the previous prediction and to send new disparity signaling information, the new disparity signaling information overruling the previously sent information.

In the above manner the present invention allows previously sent predictions to be overruled by new predictions. It is further noted that although in the above scenario (t0',d0') is on the line between (t0,d0) and (t1,d1). However this is not necessary. In fact if the situation requires it is also possible to insert a disparity jump, although this should be done with moderation as this will be visible. It is further noted that the new prediction (t1,d1') in this example coincides with the second time instance d1, however this need not always be the case.

Regarding the definition of time-instances it is noted that it may be possible to specify moments in time based on e.g. a clock which is available at a 3D target device, such as in 90 KHz increments, however it may also be based on frame numbers instead. The resolution provided by frame numbers is sufficient to provide proper disparity signaling.

As described herein above, disparity signaling information once determined may need to be packages into data segments for inclusion in a three-dimensional image signal. Table 1 provides an exemplary description of a disparity signaling segment. Table 1, clearly shows the use of page level disparity updates and/or (sub)region disparity updates. As described hereinabove, it is possible for devices that do not support (sub)region disparity updates to ignore these fields and only support the page level disparity. The page level disparity here is provided in the field page_default_disparity.

It is noted that the disparity signaling segment does not define regions or objects, but primarily focuses on the disparity signaling. Subregions however may be defined in this segment, in order to allow backwards compatibility with DVB.

Table 1, shows that there may be multiple disjunct subregions within each region. If this is the case, the value of subregion_id is different from zero.

The subregion_disparity (with integer and fractional part) apply to the whole region if subregion_id=0. Otherwise, there are multiple subregions (with different id, greater than zero) and for each subregion the disparity is given.

The region loop contains all disparity information per region and subregion (if applicable) that is different from the page default disparity.

Disparity information becomes applicable at the moment determined by the presentation time stamp (PTS) supplied with the PES packet that contains the disparity signaling segment.

It is here proposed to add to each disparity value in the disparity signaling segments a second (different) value and a time period value indicating when (e.g. after how many frames) the second value is supposed to be "reached". It is up to the implementation of the 3D target device to calculate appropriate intermediate values. The implementation may even opt to use subpixel accuracy for this or not. A new version of the disparity signaling segment can be sent to the decoder with a PTS indicating when it becomes valid, to possibly overrule the current (intermediate) state of the disparity values. If the disparity is known in advance, the updates can be synchronized to the moment the previous update has reached its final value. For live transmissions, updates can be sent at regular intervals (e.g. once per second), or they can be sent before the end of the interval to correct the current direction.

Tables 2 and 3 show a possible syntax for page_disparity_updates and subregion disparity updates respectively.

TABLE 1 disparity signaling segment syntax

| Syntax | Size | Type |
|---|---|---|
| disparity_signalling_segment( ){ | | |
|   sync_byte | 8 | bslbf |
|   segment_type | 8 | bslbf |
|   page_id | 16 | bslbf |
|   segment_length | 16 | uimsbf |
|   dss_version_number | 4 | uimsbf |
|   reserved | 3 | uimsbf |
|   page_disparity_update_included | 1 | bslbf |
|   page_default_disparity | 8 | tcimsbf |
|   if (page_disparity_update_included == 1){ | | |
|     page_disparity_update( ) | 8 | bslbf |
|   } | | |
|   while (processed_length < segment_length){ | | |
|     region_id | 8 | bslbf |
|     subregion_id | 8 | bslbf |
|     if (subregion_id != 0){ | | |
|       subregion_horizontal_position | 16 | uimsbf |
|       subregion_width | 16 | uimsbf |
|     } | | |
|     subregion_disparity_integer_part | 8 | tcimsbf |
|     subregion_disparity_fractional_part | 4 | uimsbf |
|     reserved | 3 | uimsbf |
|     subregion_disparity_update_included | 1 | bslbf |
|     if (subregion_disparity_update_included == 1){ | | |
|       subregion_disparity_update( ) | | |
|     } | | |
|   } | | |
| } | | |

TABLE 2 page_disparity_update syntax

| Syntax | Size | Type |
|---|---|---|
| page_disparity_update( ){ | | |
|   Interval | 8 | uimsbf |
|   end_page_default_disparity | 8 | tcimsbf |
| } | | |

In table 2, interval may be specified e.g. in the number of frames until end-page_default_disparity is reached and the end_page_default_disparity corresponds with the disparity value at the end of the interval.

TABLE 3 subregion_disparity_update syntax

| Syntax | Size | Type |
|---|---|---|
| subregion_disparity_update( ){ | | |
|   Interval | 8 | uimsbf |
|   end_subregion_disparity_integer_part | 8 | tcimsbf |
|   end_subregion_disparity_fractional_part | 4 | uimsbf |
|   Reserved | 4 | uimsbf |
| } | | |

In table 3, interval corresponds to the number of frames until end_subregion_default_disparity. And the values end_subregion_disparity_integer_part and end_subregion_disparity_fractional_part represent the disparity at end of interval with subpixel accuracy.

Although formatting of data in the three dimensional image signal is important, variation may be envisaged. As illustrated herein below by the tables 4, 5 and 6 respectively.

TABLE 4 alternative disparity signaling segment syntax

| Syntax | Size | Type |
|---|---|---|
| disparity_signalling_segment( ){ | | |
|   sync_byte | 8 | bslbf |
|   segment_type | 8 | bslbf |
|   page_id | 16 | bslbf |
|   segment_length | 16 | uimsbf |
|   dss_version_number | 4 | uimsbf |
|   reserved | 2 | uimsbf |
|   page_disparity_update_included | 1 | bslbf |
|   page_default_disparity | 8 | tcimsbf |
|   if (page_disparity_update_included == 1){ | | |
|     page_disparity_update( ) | 8 | bslbf |
|   } | | |
|   while (processed_length < segment_length){ | | |
|     region_id | 8 | bslbf |
|     nr_of_subregions | 8 | uimsbf |
|     if (nr_of_subregions == 1){ | | |
|       subregion_disparity_integer_part | 8 | tcimsbf |
|       subregion_disparity_fractional_part | 4 | uimsbf |
|       reserved | 3 | uimsbf |
|       subregion_disparity_update_included | 1 | bslbf |
|       if (subregion_disparity_update_included == 1){ | | |
|         subregion_disparity_update( ) | | |
|       } | | |
|     } | | |
|     if (nr_of_subregions > 1){ | | |
|     for (i== 1, i <= nr_of_subregions, i++){ | | |
|       subregion_horizontal_position | 16 | uimsbf |
|       subregion_width | 16 | uimsbf |
|       subregion_disparity_integer_part | 8 | tcimsbf |
|       subregion_disparity_fractional_part | 4 | uimsbf |
|       reserved | 3 | uimsbf |

TABLE 4-continued alternative disparity signaling segment syntax

| Syntax | Size | Type |
|---|---|---|
|     subregion_disparity_update_included | 1 | bslbf |
|     if (subregion_disparity_update_included == 1){ | | |
|       subregion_disparity_update( ) | | |
|     } | | |
|   } | | |
| } | | |
| } | | |

TABLE 5 alternative page_disparity_update syntax

| Syntax | Size | Type |
|---|---|---|
| page_disparity_update( ){ | | |
|   interval | 8 | uimsbf |
|   end_page_default_disparity | 8 | tcimsbf |
| } | | |

TABLE 6 alternative subregion_disparity_update syntax

| Syntax | Size | Type |
|---|---|---|
| subregion_disparity_update( ){ | | |
|   interval | 8 | uimsbf |
|   end_subregion_disparity_integer_part | 8 | tcimsbf |
|   end_subregion_disparity_fractional_part | 4 | uimsbf |
|   reserved | 4 | uimsbf |
| } | | |

Figure 4:
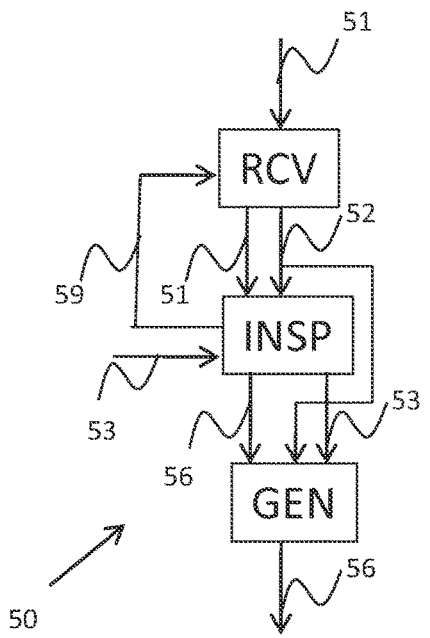
FIG. 4, shows a block diagram of a 3D source device according to the present invention.

Referring now to FIG. 4, FIG. 4 shows a block diagram of a 3D source device 50 according to the present invention. The 3D source device comprises three functional units; a receiver RCV arranged to receive multi-view image data 51, an inspection unit INSP to establish depth information and a generating unit GEN for generating the three-dimensional image signal. The source of the multi-view image data 51, can be but need not be a live camera feed. The present invention may also be used with content originating from a video delay line for a live feed, or a conventional storage device for that matter. Although the present invention is particularly suited for live content, it may also be used for pre-recorded content.

The multi-view image data 51 may for example represent stereo-video in the form of one of compressed or uncompressed stereo-pairs. Alternatively the multi-view comprises more than two views. In the example depicted the multi-view image data 51 is an uncompressed video stream comprising stereo-pairs. The receiver block in this particular case also compresses the incoming multi-view image data 51 thereby forming the first component 52 comprising the multi-view image data.

The uncompressed image data 51 is sent to an inspection unit, the inspection unit here is arranged to establish a depth map on-the fly. Alternatively the input stream may be provided with a depth map, e.g. established using a range finder, or depth camera. The inspection unit also receives overlay data 53 for overlaying the multiview image data 51. In an exemplary implementation the overlay data 53 is subtitle information which may e.g. be manually entered or generated based on speech recognition and which is to be combined with the multiview image data.

The inspection unit outputs a third component 56 in the form of disparity signaling information for inclusion in the generated three dimensional signal 56. As the inspection unit has access to depth information present in the multi-view information and has information on the location of the subtitles (as in this example), it is possible to position the subtitles in front of the objects in the multi-view image data. If there is insufficient depth range available to accommodate the subtitles, the inspection unit may further provide cropping information 59 to the compression block in order to e.g. crop the left and right images so as to adopt the overall depth range. After which the inspection unit re-iterates and can prepare the disparity signaling information for inclusion in the output signal.

Subsequently the generating unit is arranged to generate the three dimensional image signal 56 as output by the 3D source device, based on the first component in the form of the multi-view image data 52, the overlay data 53 and the disparity signaling segment.

It will be clear to those skilled in the art that the compression and the cropping control as described herein above with reference to FIG. 4 add to the advantages of this particular embodiment, but are not essential to the invention.

Figure 5:
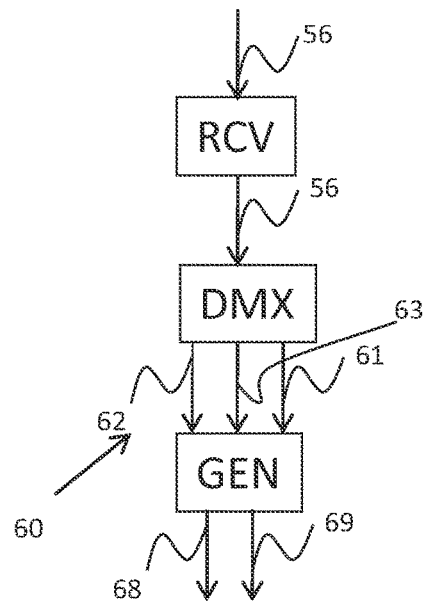
FIG. 5, shows a block diagram of a 3D target device according to the present invention.

Now referring to FIG. 5, FIG. 5 shows a block diagram of a 3D target device 60 according to the present invention. The 3D target device comprises a receiver RCV for receiving the three dimensional image signal 56 according to the present invention. The receiver may e.g. be a DVB receiver, or an HDMI display interface unit. The incoming signal 56 is subsequently passed through a demultiplexer DMX that extracts the respective components from the three dimensional image signal and prepares the components for further processing down-stream. In this exemplary embodiment the received first component 61, the received second component 62 and the received third component 63.

The received first component 61 comprises multi-view image data, the second component comprises overlay data and the third component comprises the disparity signaling information. These three components are subsequently used by a generator GEN in order to generate two output images 68 and 69 which correspond with the left and right images of respective stereo-pairs. The left and right images may be generated by properly displacing objects located in regions in accordance with the disparity signaling information as described with reference to the FIGS. 1A and 1B.

As described hereinabove, a three dimensional image signal in accordance with the present invention, provides information regarding the placement of overlays over multi-view footage. In one embodiment such a three dimensional image signal is broadcast, unicast, or multi-cast by a broadcaster. The signal may e.g. be broadcast using a 3D compliant DVB-T version comprising the disparity signaling information according to the present invention. When such a three-dimensional image signal is received by a STB, and the STB uses the disparity signaling information to properly overlay subtitles, the STB may also forward the disparity signaling information to further downstream devices such as a display device.

In the abovementioned case the display device can use the disparity signaling information e.g. when generating its OSD, such that the display device OSD does not collide with the stereo-images received by the television (which includes the overlaid subtitles).

The present invention may also be used when the STB chooses to furthermore overlay its OSD to the stereo-images, in this case the STB should adapt the disparity signaling information accordingly, such that the display device can also accommodate.

Although the present invention is explained primarily with reference to content broadcast such as using DVB or ATSC, it is also possible to use the present invention when distributing content over the Internet.

Figure 6:
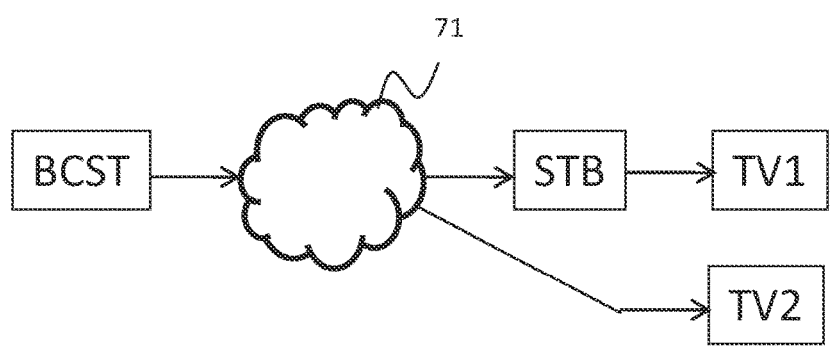
FIG. 6, shows a system employing a 3D source device and 3D sink device according to the present invention.

Now referring to FIG. 6, FIG. 6 shows a system employing a 3D source device BCST and two target devices STB and TV2 according to the present invention. The three dimensional image signal according to the present invention is transmitted by the 3D source device through a medium 71, such as the airwaves, the internet, or a cable connection to the two target devices STV and TV2. In this case the 3D target device STB is connected by means of a 3D capable HDMI interface to the display device TV1.

It is noted that the present application describes two inventive concepts that are preferably combined. The first concept relates to the use of a single disparity predictor in disparity signaling for use in overlaying in a three dimensional image signal. The use of a single predictor has as a key advantage the fact that when overlaying information over live content, a smooth disparity transition may be realized, in a manner that does not require large overhead. The second concept relates to the fact that the present invention proposes to use disparity signaling using one or more predictors, wherein these one or more predictors can be overruled by new predictors. In this manner it remains possible to use predictors for realizing smooth disparity profiles, while still providing flexibility for accommodating live footage. Moreover when only a single predictor is used a smooth disparity profile can be realized and the efficiency penalty when a predictor is overruled remains low.

Although throughout the application text reference is made to disparity information, it is well known to those skilled in the art that depth an disparity are related. In fact when information is available regarding the mapping of depth to disparity, it may be possible to use depth signaling instead of disparity signaling.

In view of the above it is understood that disparity signaling throughout the application is also understood to include depth signaling, provided that information is provided to map depth values to disparity values.

However, in view of the obvious advantage of using disparity signaling, in that no mapping function is required, the application and claims have been drafted referring to disparity signaling only.

It is noted that the invention may be implemented in hardware and/or software, using programmable components, as such implementations may be envisaged based entirely or in part on dedicated HW, ASICs, FPGAs and/or PCs.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A three-dimensional (3D) source device outputting a three-dimensional image signal, the three-dimensional image signal comprising multi-view image data, the 3D source device comprising:

an input for receiving image data; and a generator arranged to generate the three-dimensional image signal based on the image data, the three-dimensional image signal comprising:

a first component comprising multiple two-dimensional (2D) images for use in stereoscopic viewing;

a second component comprising overlay data;

a third component defining first disparity signaling information for use with the overlay data over the respective ones of the multiple 2D images, wherein the third component comprises a first parameter defining first disparity information, the first disparity information comprising a first time-varying disparity profile for providing a first predictor for indicating how a disparity of an overlay is expected to change over time; and a fourth component, at a later time in the three-dimensional image signal than the third component, defining second disparity signaling information for use with the overlay data over the respective ones of the multiple 2D images, wherein the fourth component comprises a second parameter defining second disparity information, the second disparity information comprising a second time-varying disparity profile for providing a second predictor for indicating how the disparity of the overlay is expected to change over time, the second disparity signaling information overruling the first disparity signaling information and the first predictor.

2. The device of claim 1, wherein the third component comprises the first disparity signaling information for use in overlaying the overlay data in a region over the respective ones of the multiple 2D images.

3. The device of claim 1, wherein the third component allows signaling for multiple disjunctive regions and/or sub-regions.

4. The device according to claim 1, wherein the first disparity signaling information for the first time-varying disparity profile is provided in disparity signaling segments of the three-dimensional image signal, and wherein a segment comprises a single predictor.

5. A three-dimensional (3D) target device receiving a three-dimensional image signal, the three-dimensional image signal comprising multi-view image data, the 3D target device comprising:

a receiver arranged to receive the three-dimensional image signal;

a demultiplexer arranged to demultiplex the three-dimensional image signal into at least:

a first component comprising multiple two-dimensional (2D) images for use in stereoscopic viewing;

a second component comprising overlay data;

a third component defining first disparity signaling information for use with the overlay data over the respective ones of the multiple 2D images, wherein the third component comprises a first parameter defining first disparity information, the first disparity information comprising a first time-varying disparity profile for providing a predictor for indicating how a disparity of an overlay is expected to change over time; and a fourth component, at a later time in the three-dimensional image signal than the third component, defining second disparity signaling information for use with the overlay data over the respective ones of the multiple 2D images, wherein the fourth component comprises a second parameter defining second disparity information, the second disparity information comprising a second time-varying disparity profile for providing a second predictor for indicating how the disparity of the overlay is expected to change over time, the second disparity signaling information overruling the first disparity signaling information and the first predictor; and a generator arranged to generate respective 2D images for use in stereoscopic viewing, wherein the overlay data is overlaid as defined within the first and second disparity signaling information.

6. The device of claim 5, wherein the third component comprises the first disparity signaling information for use in overlaying the overlay data in a region over the respective ones of the multiple 2D images.

7. The device of claim 5, wherein the third component allows signaling for multiple disjunctive regions and/or sub-regions.

8. The device according to claim 5, wherein the first disparity signaling information for the first time-varying disparity profile is provided in disparity signaling segments of the three-dimensional image signal, and wherein a segment comprises a single predictor.

9. A method of producing a three-dimensional image signal, the method comprising:
receiving image data; and
generating three-dimensional image signal based on the image data, the three-dimensional image signal comprising:
a first component comprising multiple two-dimensional (2D) images for use in stereoscopic viewing;
a second component comprising overlay data;
a third component defining first disparity signaling information for use with the overlay data over the respective ones of the multiple 2D images, wherein the third component comprises a first parameter defining first disparity information, the first disparity information comprising a first time-varying disparity profile for providing a first predictor for indicating how a disparity of an overlay is expected to change over time; and
a fourth component, at a later time in the three-dimensional image signal than the third component, defining second disparity signaling information for use with the overlay data over the respective ones of the multiple 2D images, wherein the fourth component comprises a second parameter defining second disparity information, the second disparity information comprising a second time-varying disparity profile for providing a second predictor for indicating how the disparity of the overlay is expected to change over time, the second disparity signaling information overruling the first disparity signaling information and the first predictor.

10. A method of consuming a three-dimensional image signal, the method comprising:
receiving the three-dimensional image signal;
demultiplexing the three-dimensional image signal into at least:
a first component comprising multiple two-dimensional (2D) images for use in stereoscopic viewing;
a second component comprising overlay data;
a third component defining first disparity signaling information for use with the overlay data over the respective ones of the multiple 2D images, wherein the third component comprises a first parameter defining first disparity information, the first disparity information comprising a first time-varying disparity profile for providing a first predictor for indicating how a disparity of an overlay is expected to change over time; and
a fourth component, at a later time in the three-dimensional image signal than the third component, defining second disparity signaling information for use in overlaying image data over the respective ones of the multiple 2D images, wherein the fourth component comprises a second parameter defining second disparity information, the second disparity information comprising a second time-varying disparity profile for providing a second predictor for indicating how the disparity of the overlay is expected to change over time, the second disparity signaling information overruling the first disparity signaling information and the first predictor; and
generating respective 2D images for use in stereoscopic viewing, wherein the overlay data is overlaid as defined within the first and second disparity signaling information.

11. A computer program product stored on a non-transitory computer readable medium, the computer program product comprising instructions, which when executed on a computing platform, perform the method of claim 9.

12. The device of claim 1, wherein the first time-varying disparity profile includes one of: (1) at least two disparity values and corresponding time-stamps for the each of the disparity values; and (2) a next disparity value, a time-stamp for the next disparity value, and a value defining a variation in the disparity beginning at a time corresponding the time-stamp for the next disparity value.

13. The device of claim 5, wherein the first time-varying disparity profile includes one of: (1) at least two disparity values and corresponding time-stamps for the each of the disparity values; and (2) a next disparity value, a time-stamp for the next disparity value, and a value defining a variation in the disparity beginning at a time corresponding the time-stamp for the next disparity value.

14. The method of claim 9, wherein the first time-varying disparity profile includes one of: (1) at least two disparity values and corresponding time-stamps for the each of the disparity values; and (2) a next disparity value, a time-stamp for the next disparity value, and a value defining a variation in the disparity beginning at a time corresponding the time-stamp for the next disparity value.

15. The method of claim 10, wherein the first time-varying disparity profile includes one of: (1) at least two disparity values and corresponding time-stamps for the each of the disparity values; and (2) a next disparity value, a time-stamp for the next disparity value, and a value defining a variation in the disparity beginning at a time corresponding the time-stamp for the next disparity value.

16. The device of claim 1, wherein the third component comprises a packetized elementary stream packet having the first disparity signaling information, the first disparity signaling information including at least a first disparity value, a second disparity value, and a time period value indicating a time when the second disparity value is predicted to be reached.

17. The device of claim 16, wherein the time period value indicates a number of frames predicted to occur between the first disparity value and the second disparity value.

18. The device of claim 5, wherein the third component comprises a packetized elementary stream packet having the first disparity signaling information, the first disparity signaling information including at least a first disparity value, a second disparity value, and a time period value indicating a time when the second disparity value is predicted to be reached.

19. The system of method of claim 9, wherein the third component comprises a packetized elementary stream packet having the first disparity signaling information, the first disparity signaling information including at least a first disparity value, a second disparity value, and a time period value indicating a time when the second disparity value is predicted to be reached.

20. The method of claim 10, wherein the third component comprises a packetized elementary stream packet having the first disparity signaling information, the first disparity signaling information including at least a first disparity value, a second disparity value, and a time period value indicating a time when the second disparity value is predicted to be reached.

* * * * *